July 31, 1923.
A. L. STANFORD
LIFTING JACK
Filed Jan. 23, 1922
1,463,635
2 Sheets-Sheet 1
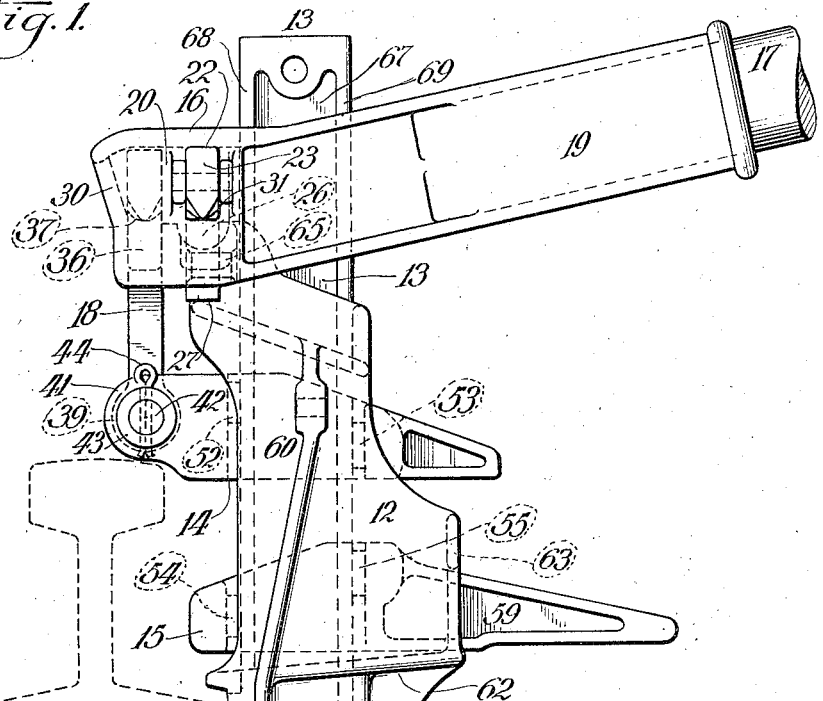
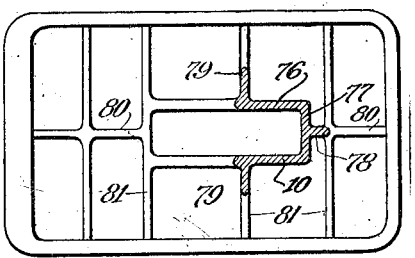
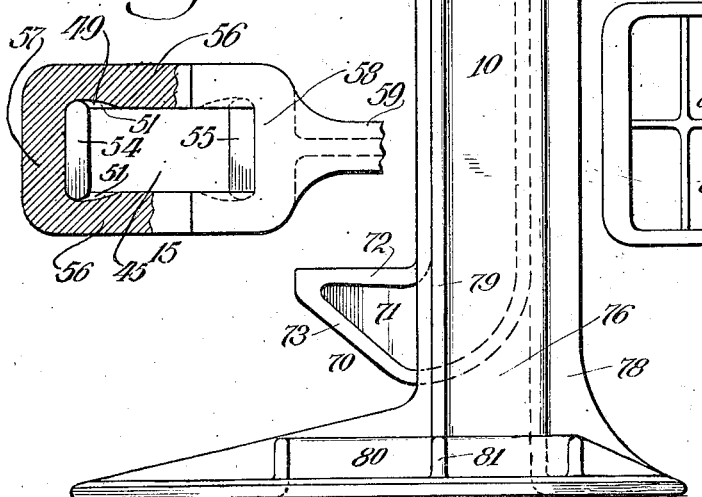
Inventor:
Arthur L. Stanford.
By Banning Banning
Attys.

July 31, 1923.  
A. L. STANFORD  
LIFTING JACK  
Filed Jan. 23, 1922  
1,463,635  
2 Sheets-Sheet 2
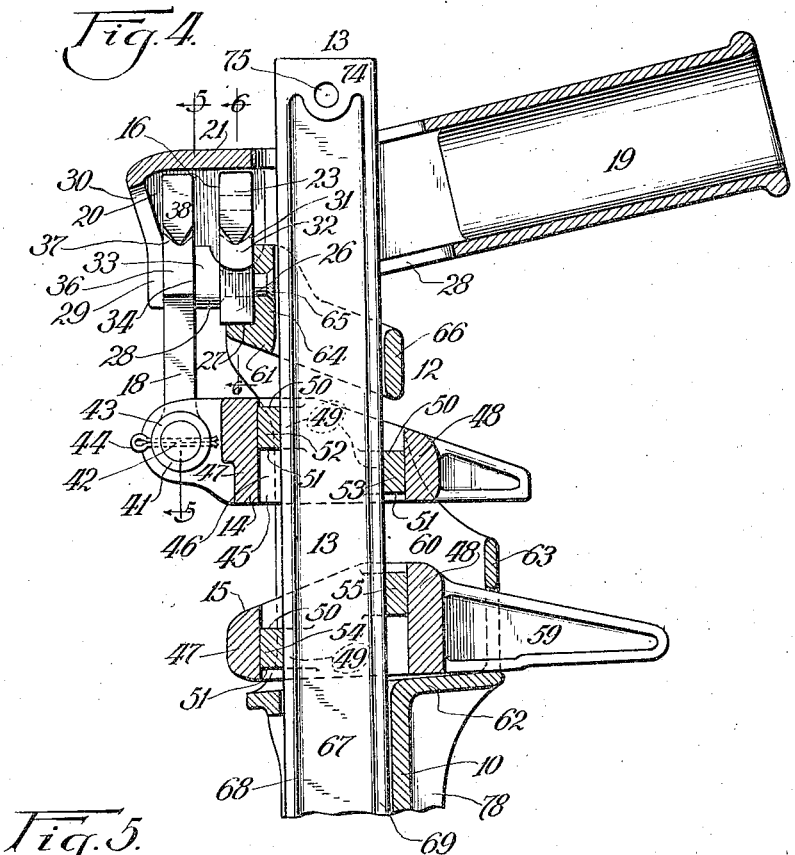
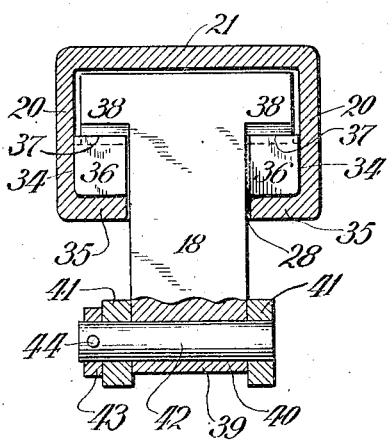
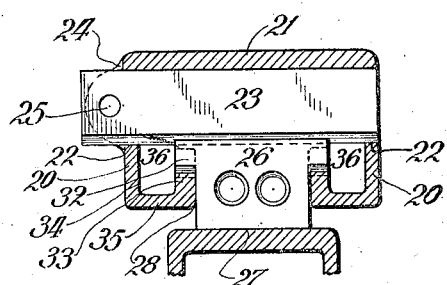
Inventor:
Arthur L. Stanford Patented July 31, 1923.

1,463,635

UNITED STATES PATENT OFFICE.

ARTHUR L. STANFORD, OF CHICAGO, ILLINOIS.

LIFTING JACK.

Application filed January 23, 1922. Serial No. 531,087.

*To all whom it may concern:*

Be it known that I, ARTHUR L. STANFORD, a citizen of the United States, residing at Chicago, in the county of Cook and State of Illinois, have invented certain new and useful Improvements in Lifting Jacks, of which the following is a specification.

The jack of this invention is designed primarily though not exclusively for use as a railroad jack; and the object of the invention is to simplify the construction to the utmost by reducing the number of parts to a minimum, thereby economizing in the cost of manufacture, and also reducing the liability to breakage when subjected to the onerous conditions of heavy service.

A further object of the invention is to so design and arrange the parts that the length of the short arm of the lever, that is to say, the distance from the fulcrum point to the point of delivery of the power, may be minimized without sacrifice of strength, so that a high leverage ratio may be employed, without, however, imposing structural limitations which necessarily restrict the leverage to a specified ratio.

A further object of the invention is to so design the parts that the same may be assembled and held together by the use of a minimum number of connections, the several bearing members being so designed as to be locked in position by the insertion of the fulcrum bar, so that not only is the use of rivets, bolts or other means for connecting the parts together avoided in large measure, but the arrangement permits of the ready assembling and disassembling of the constituent portions of the structure.

Another object of the invention is to so design the parts that the bearing members may be formed of tempered steel or the like, and so related as to reduce the frictional wear to a minimum and at the same time permit of a ready substitution of the parts in case of wear or breakage.

The invention also relates to an arrangement of parts which is designed to increase the radius of action of the mechanism with a view to avoiding interference with the rail or other structure being lifted. The invention also relates to the details of construction and formation of the lifting bar, which is designed with a view to simplifying the structure and configuring the same in such a manner as to afford abundance of strength and rigidity without making the same excessively heavy or rugged.

The invention as a whole is designed to conform, in its structure, to the requirements and limitations of foundry and rolling mill practice, so that the same may be readily and cheaply manufactured.

In the drawings:

Figure 1 is a side elevation of the lifting jack in form to operate in the lifting of rails and ties in track construction or repair;

Fig. 2 is a sectional plan view of the base of the standard;

Fig. 3 is a plan view partly in section of the lower or locking clutch member;

Fig. 4 is a sectional elevation of the standard socket, lever head and associated parts;

Fig. 5 is a cross sectional elevation of the lever head, taken on line 5—5 of Fig. 4, showing the hanger mainly in elevation; and Fig. 6 is a cross sectional elevation of the lever head, taken on line 6—6 of Fig. 4, showing the fulcrum bar and bearing block in elevation.

The jack as a whole comprises a standard 10, springing from a base plate 11 and carrying at its upper end a standard socket 12 through which extends a lifting bar 13 adapted to be actuated by an active upper clutch member 14, and held when lifted by a locking lower clutch member 15. The standard socket has mounted thereon a lever head 16, which is designed to receive the usual lever handle or bar 17; and the upper active clutch member is actuated by means of a hanger 18.

The present invention is directed to the formation and construction of the various parts above enumerated, and to the arrangement of the fulcrum and bearing members whereby the same are actuated, and the specific construction of the several parts named will now be described.

The lever head is formed to provide a socket shank 19 which merges into side walls 20 which are connected or roofed over by a top wall 21 which is transversely elongated, the head as a whole being of generally rectangular configuration in cross section. The top wall of the head is continuous and imperforate, but the side walls, near the forward or acting end, are broken by aligned rectangular slots 22 which are vertically elongated and in conjunction provide for the entering therethrough of a fulcrum bar 23 which extends completely through the head and emerges on one side thereof between a pair of ears or lugs 24, the fulcrum being locked in place by means of a cotter pin 25 or the like, which is entered through the ears or lugs and through the projecting end of the fulcrum bar. The upper edge of the fulcrum bar bears directly against the roof or top wall of the head throughout its entire length, with the exception of the short outer projection, so that it is firmly supported and reinforced to withstand heavy pressure. The lower edge of the fulcrum bar is substantially wedge-shaped to afford a rocker bearing surface which rests upon a fulcrum bearing block 26 resting upon a shoulder 27 formed on the forward upper face of the lever socket 12.

The forward side walls of the lever head embrace and enclose the upper end of the socket member, the head being provided in its under side with a longitudinally elongated slot or opening 28, to allow the necessary clearance during the up and down swinging movements of the lever head. This lower opening 28 merges into an opening 29 in the front wall 30 of the head, so that the construction of the head as a whole presents the character of a boxlike structure inclosed on the top and sides and mainly open on the bottom and front.

The fulcrum bearing block 26 is formed with a V-shaped groove or channel 31 which extends completely across its upper or acting face, and the body of the bearing block is of reduced cross dimensions to afford a pair of rounded trunnion shoulders 32 each of which bears against a concavely recessed wall 33 upstanding from the bottom of the lever head, the two walls occupying positions adjacent to the bottom slot 28 on opposite sides thereof. This arrangement serves to hold the fulcrum block firmly against its bearing and allow it to rock thereon while at the same time preventing any side tilting or canting movement of the head by reason of the close engagement of the trunnion shoulders with the fixed bearing block, which are engaged on the under side by the concavely formed recesses in the bearing walls 33. Of course, it will be understood that the curvature of these recesses is concentric, or substantially so, with the axis of movement of the lever head about the fulcrum point.

The inner walls 33 terminate at a point substantially in line with the transverse center of the head, leaving on each side a socket space 34, which is subtended between the front edge of the proximate inner wall 33 and the front wall 30 of the head and floored by the bottom wall 35 of the head, which is uncut at points laterally adjacent to the center opening. These spaces provide for the insertion on each side of a hanger bearing block 36 which is provided with a V-shaped groove in its upper edge 37, the two blocks being aligned and affording bearings for the support of the hanger 18, which is widened at its upper end to afford bearing shoulders 38 which are V-shaped to rock upon the bearing blocks, the body of the hanger depending within the space between the bearing blocks.

The hanger 18, at its lower end, merges into an enlarged head 39 provided with a cross bore 40, the head being mounted between a pair of forwardly extending ears 41 on the upper active clutch member 14, to which it is pivoted by a cross pin 42 which extends through the ears or lugs 41 and into a boss 43 formed on one of the ears or lugs, being held in place by means of a cotter pin 44 entered through the boss and through the end of the pivot pin.

The active clutch member 14 is provided through its center with a squared opening 45, leaving side walls 46, a front cross wall 47, and a rear cross wall 48. Each of the side walls, at a point closely adjacent to the front cross wall 47, is cut to afford a recess 49 having a sloping base wall which affords upper and lower parallel shoulders 50–51 which provide points of support for a forward friction block 52 located at a relatively high level, which friction block co-operates with a rear forward friction block 53 similarly socketed and occupying a relatively lower position. Between the two friction blocks extends the upper end of the lifting bar 13, which also extends through the lower and upper walls of the lever head 16, being capable of elevation to a point considerably above the latter during the lifting operation of the jack.

The friction blocks 53 bear closely against the front and rear faces of the lifting bar and are adapted to grip thereon and effect a lifting thereof as the lever is operated. The friction blocks are of slightly greater length than the width of the opening 45 and may be slipped into place within the sockets 49 by entering one end in oblique relation and then pressing back on the free end, the configuration of the sockets permitting this kind of an operation. After the blocks are socketed they will be held against displacement by contact with the lifting bar.

The lower or retaining clutch member 15 extends through the socket and is similar in formation to the active clutch member 14, with the exception that the parts are arranged in reverse relation; that is to say, the forward friction block 54 occupies a lower position with respect to the rear friction block 55, the blocks being socketed in recesses similar in formation to those previously described. The lower retaining clutch is provided with side walls 56, a front cross wall 57, and a rear cross wall 58, which latter has extending therefrom a tail piece 59 which may be depressed to hold the blocks out of clutching relation when it is desired to rock the lifting bar.

The upper and lower clutch members extend from front to rear through the socket 12, which socket is provided with side walls 60, an obliquely disposed upper cross wall 61 which is elevated toward the front, and a lower cross wall 62 which is elevated toward the rear. The side walls are connected on their rear sides by a rear bridge wall 63, a space being afforded below the bridge wall for the outer projection of the tail piece 59. Above the upper cross wall 61 the side walls are extended and cut out on the forward side to afford the shoulder 27 which supports the lower edge of the fulcrum bearing block 26. At a point adjacent to the shoulder 27, the side walls of the head are connected by a front cross partition 64, through which is entered a rivet 65 which holds the fulcrum bearing block securely in place. The side walls are further connected or reinforced by the provision of an upper bridge wall 66 extending across the rear side, leaving a continuous unbroken space for the up and down movements of the lifting bar. The arrangement of the lower clutch member is such that with the lifting bar in place the clutch member will contact the lower or base wall 62 of the socket only at the rear point thereof, so that, with the release of the upper or active clutch member, the locking clutch member will tend to be downwardly tilted or canted at its forward end, thereby imposing a gripping action on the lifting bar, which condition will continue unless the forward end of the locking clutch member is lifted by depressing the tail piece.

The lifting bar 13 is given an I beam configuration; that is to say, it is formed with a relatively thin center web 67, and relatively widened front and rear faces 68 and 69 respectively. At its lower end it terminates in a foot 70 provided with a center web 71, an upper bearing face 72, and a lower bracing face 73. The upper end of the lifting bar 13 is provided with a boss 74 across the web, so as to present at its upper end a rectangular configuration, and the boss is provided with a cross bore 75, the arrangement being such as to permit of the use of a cap head (not shown) where the jack is intended to impart a direct upward thrust to a superposed weight.

The standard is formed with side walls 76 and a rear cross wall 77, which rear wall is reinforced in the center by a rib 78, and the side walls are reinforced along their front edges by lateral ribs 79, the front of the standard being open to allow movement of the foot. The base plate 11, from which the standard springs, is elongated from front to rear, its major dimension extending forwardly of the standard, and the base plate is suitably reinforced by longitudinal and transverse ribs or flanges 80 and 81 to afford the necessary strength and rigidity.

In use, a down movement of the lever will rock the lever head about its fulcrum point, thereby lifting the hanger and with it the forward end of the active clutch member, which lifting force, being applied at a point in advance of the lifting bar, will cause a canting tendency to the clutch member, thereby causing the friction blocks to engage the bar and lift the same. Immediately upon the release of the lever, the tendency for the bar to descend will cause a down tilting or canting movement of the locking clutch member, which will cause the friction blocks in said member to grip and resist the downward movement. The reverse arrangement of the friction blocks in the two clutch members accommodates the movement mentioned; that is to say, a lifting movement of the lifting bar will tend to rock the locking member in a manner to effect a release of the gripping blocks concurrently with the gripping by the upper clutch member, and vice versa on the release of the lever.

The flattened formation of the fulcrum bar and the hanger permit these two members to be located in very close proximity to one another, with a resultant reduction in the length of the short arm of the lever, so that any practical lever ratio which may be desired can be easily provided for by merely locating these members at points in the desired proximity to one another. This easily enables the use of a sixty-to-one ratio or greater, by providing a lever having a long arm five feet in length and a short arm one inch in length, which is a higher lever ratio than can be readily secured in the case of jacks of the character commonly used.

The arrangement, furthermore, is one which permits the hanger and its bearing head to be integrally constructed and the bearing point suitably hardened, which obviates the necessity for using cross pins or other expedients which would tend either to weaken the resulting structure or objectionably increase its dimensions in proximity to the fulcrum point. At the same time the arrangement is one which permits the bearing blocks to be inserted in place without bolts, rivets or other fastenings, and to be locked against displacement when the constituent portions of the jack are assembled, the insertion of the fulcrum bar and the hanger serving to lock the entire assembly against displacement.

As constructed, it will be noted that but a pair of rivets are employed, being the ones which are utilized to hold the fulcrum bearing block 26 in position against the shoulder on the socket head. At the same time, the arrangement is one which enables all the bearing parts to be properly tempered and hardened, so that wear will be reduced to a minimum, and this wear is further reduced by the employment of rocking contact members in lieu of pivot pins or the like which are commonly employed for similar purposes.

The I beam construction of the lifting bar is one which peculiarly adapts the bar to subserve its intended functions, in that the web affords abundant reinforcement against any tendency to bend or buckle in a fore and aft direction, and at the same time the front and rear faces, being much wider than the web, afford the necessary frictional surfaces for engagement with the friction blocks. Furthermore, by mounting the lower end of the hanger in the manner indicated, the degree of clearance above a rail or like obstruction is increased to a desirable degree, thereby increasing the radius of action of the parts correspondingly. The entire structure has been designed with due regard to the requirements of foundry practice, so that the structure may be easily manufactured and readily assembled.

I claim:

1. In a lifting jack, the combination of a socket member, a lifting bar slidable within the socket member, clutch members for engaging the lifting bar, a lever head embracing the lifting bar, a hanger connecting the lever head with one of the clutch members, a fulcrum bar extending transversely through the center of the lever head, and a fulcrum bearing block supported on the socket member and presenting the centrally disposed portion of its upper edge for contact with the lower edge of the fulcrum bar and having an undercut shoulder on each side, the lever head having on each side a member adapted to rock beneath the proximate shoulder of the fulcrum bearing block, substantially as described.

2. In a lifting jack, the combination of a socket member, a lifting bar slidable within the socket member, clutch members for engaging the lifting bar, a lever head embracing the lifting bar, a hanger connecting the lever head with one of the clutch members, a fulcrum bar extending transversely through the center of the lever head, and a fulcrum bearing block supported on the socket member and presenting the centrally disposed portion of its upper edge for contact with the lower edge of the fulcrum bar and having on each side an undercut portion forming a shoulder having a curved under bearing face, and the lever head having beneath each of said shoulders a cross wall provided with a concave recess affording a rocking surface in engagement with the proximate shoulder, substantially as described.

3. In a lifting jack, the combination of a socket member, a lifting bar slidable within the socket member, clutch members for engaging the lifting bar, a lever head embracing the lifting bar, a hanger connecting the lever head with one of the clutch members, a fulcrum bar within the lever head, and a fulcrum bearing block presenting its central portion for co-operation with the fulcrum bar and supported on the socket member and having a shoulder on each side, the lever head having on each side a member adapted to rock beneath the proximate shoulder of the fulcrum bearing block, and the head being provided with side walls which serve to enclose said bearing block, substantially as described.

4. In a lifting jack, the combination of a socket member, a lifting bar slidable within the socket member, clutch members for engaging the lifting bar, a lever head embracing the lifting bar, a hanger connecting the lever head with one of the clutch members, a fulcrum bar within the lever head, and a fulcrum bearing block presenting its central portion for co-operation with the fulcrum bar and supported on the socket member and having on each side an undercut portion forming a shoulder having a curved bearing face, and the lever head having beneath each of said shoulders a cross wall provided with a concave recess affording a rocking surface in engagement with the proximate shoulder, and the head being provided with side walls which serve to enclose said bearing block and recessed inner cross walls, substantially as described.

5. In a lifting jack, the combination of a socket member, a lifting bar slidable within the socket member, a pair of clutch members associated with the lifting bar, a lever head embracing the lifting bar, a hanger connecting one of the clutch members with the lever head, a fulcrum bar entered through the lever head, and a fulcrum bearing block fixedly secured to the socket member, the side walls of the lever head embracing and enclosing the upper end of the socket member and the bearing block carried thereby, substantially as described.

6. In a lifting jack, the combination of a socket member, a lifting bar slidable within the socket member, a pair of clutch members associated with the lifting bar, a lever head embracing the lifting bar, a hanger connecting one of the clutch members with the lever head, a fulcrum bar entered through the lever head, and a fulcrum bearing block fixedly secured to the socket member, the side walls of the lever head embracing and enclosing the upper end of the socket member and the bearing block carried thereby, the fulcrum bar being wedge shaped along its lower edge, and the bearing block being grooved along its upper edge, substantially as described.

7. In a lifting jack, the combination of a socket member, a bearing block carried by the socket member, a lever head, a fulcrum bar extending transversely of the lever head and fulcrumed upon the bearing block, the fulcrum bar being of flattened formation and having its vertical dimension in excess of its front to rear dimension, a pair of spaced hanger bearing blocks carried by the lever head, the hanger being provided at its upper end with laterally extending shoulders engaging the spaced bearing blocks, the body of the hanger depending between said bearing blocks, and the vertical dimension of the upper shouldered portion of the hanger being in excess of its front to rear dimension to conform the parts to a close relationship with the fulcrum bar, a lifting bar entered through the socket member, and clutch members associated with the lifting bar, one of such clutch members being pivotally connected to the hanger, substantially as described.

8. In a lifting jack, the combination of a socket member, a bearing block carried by the socket member, a lever head, a fulcrum bar extending transversely of the lever head and fulcrumed upon the bearing block, the fulcrum bar being of flattened formation and having its vertical dimension in excess of its front to rear dimension, a pair of spaced hanger bearing blocks carried by the lever head, the hanger being provided at its upper end with laterally extending shoulders engaging the spaced bearing blocks, the body of the hanger depending between said bearing blocks, and the vertical dimension of the upper shouldered portion of the hanger being in excess of its front to rear dimension to conform the parts to a close relationship with the fulcrum bar, a lifting bar entered through the socket member, and clutch members associated with the lifting bar, the upper clutch member being provided on its forward side with spaced ears embracing the lower end of the hanger, and a pivot pin entered through said ears and through the hanger, substantially as described.

9. In a lifting jack, the combination of a socket member, a bearing block carried by the socket member, a lever head, a fulcrum bar extending transversely of the lever head and fulcrumed upon the bearing block, the fulcrum bar being of flattened formation and having its vertical dimension in excess of its front to rear dimension, a pair of spaced hanger bearing blocks carried by the lever head, a hanger provided at its upper end with laterally extending shoulders engaging the spaced bearing blocks, the body of the hanger depending between said bearing blocks, and the vertical dimension of the upper shouldered portion of the hanger being in excess of its front to rear dimension to conform the parts to a close relationship with the fulcrum bar, a lifting bar entered through the socket member, and clutch members associated with the lifting bar, the upper clutch member being provided on its forward side with spaced ears embracing the lower end of the hanger, and a pivot pin entered through said ears and through the hanger, one of the ears being outwardly extended to provide a boss to receive the end of the pin, and a connection entered through said boss and into the pin, substantially as described.

10. In a lifting jack, the combination of a socket head, a lever head associated therewith, a lifting bar entered through the socket head and through the lever head, a flattened generally rectangular fulcrum bar entered through the lever head and provided with a wedge shaped lower edge, the vertical dimension of the fulcrum bar being in excess of the front to rear dimension, a bearing block similarly flattened and carried by the socket member and provided along its upper edge with a groove to receive the edge of the fulcrum bar, said block being undercut to provide lateral shoulders having rounded under faces, and the lever head being provided with inner upstanding cross walls arcuately recessed on their upper edges to ride under the rounded shoulders, a pair of spaced bearing blocks carried by the lever head and housed within the spaces intermediate the front edges of the respective inner cross walls, the front wall of the lever head and the side walls thereof, a hanger undercut near its upper end to afford lateral wedge shaped shoulders engaging the bearing blocks, said shouldered portion being flattened to reduce its front to rear dimension as compared with its vertical dimension and to conform the parts to a close spacing of the hanger with respect to the fulcrum bar, and a pair of clutch members embracing the lifting bar, the upper clutch member being pivotally connected to the hanger, substantially as described.

11. In a lifting jack, the combination of a socket head, a lever head associated therewith, a lifting bar entered through the socket head and through the lever head, a flattened generally rectangular fulcrum bar entered through the lever head and provided with a wedge shaped lower edge, the vertical dimension of the fulcrum bar being in excess of the front to rear dimension, a bearing block similarly flattened and carried by the socket member and provided along its upper edge with a groove to receive the edge of the fulcrum bar, said block being undercut to provide lateral shoulders having rounded under faces, and the lever head being provided with inner upstanding cross walls arcuately recessed on their upper edges to ride under the rounded shoulders, a pair of spaced bearing blocks carried by the lever head and housed within the spaces intermediate the front edges of the respective inner cross walls, the front wall of the lever head and the side walls thereof, a hanger undercut near its upper end to afford lateral wedge shaped shoulders engaging the bearing blocks, said shouldered portion being flattened to reduce its front to rear dimension as compared with its vertical dimension and to conform the parts to a close spacing of the hanger with respect to the fulcrum bar, and a pair of clutch members embracing the lifting bar, the upper clutch member being bifurcated at its forward end to receive the lower end of the hanger, and a pivot pin entered through said bifurcated portion and through the hanger, substantially as described.

12. In a lifting jack, the combination with a standard carrying a socket member, of a lifting bar, a fulcrumed lever head and a hanger depending from the lever head, a pair of clutch members embracing the lifting bar, each of said clutch members being provided in its side walls with front and rear tapered recesses affording shoulders, and front and rear friction blocks entered into said recesses and supported by said shoulders and adapted to engage the front and rear edges of the lifting bar, substantially as described.

13. In a lifting jack, the combination with a lifting bar, of a clutch member and means for operating the clutch member, said clutch member being provided with a center opening for the passage of the lifting bar, said opening affording side walls and front and rear cross walls, each side wall at points adjacent respectively to the front and rear cross walls being provided with a tapered recess affording shoulders, and front and rear friction blocks entered within said recesses and supported by said shoulders and adapted to engage the lifting bar, substantially as described.

14. In a lifting jack, in combination with a clutch member provided with front and rear friction blocks, a lifting bar entered through said clutch member and adapted to be engaged at the front and rear by said friction blocks, the lifting bar being of I formation to afford a pair of relatively wide front and rear contact faces for engagement by the friction blocks, and a relatively thin connecting web to afford the necessary front to rear rigidity, substantially as described.

15. In a lifting jack, in combination with a clutch member provided with front and rear friction blocks, a lifting bar entered through said clutch member and adapted to be engaged at the front and rear by said friction blocks, the lifting bar being of I formation to afford a pair of relatively wide front and rear contact faces for engagement by the friction blocks, and a relatively thin connecting web to afford the necessary front to rear rigidity, said lifting bar terminating at its lower end in a foot having a widened upper contact face, the same being an angular extension of the forward face of the lifting bar, said foot comprising a web and a lower laterally flanged portion, the same being extensions of the web and rear face respectively of the body of the lifting bar, substantially as described.

16. In a lifting jack, in combination with a lifting bar and means for imparting vertical movement thereto, of a lever and a connection between the lever and said actuating means for the lifting bar, co-acting members providing a fulcrum bearing for the lever, and co-acting members affording a pivotal mounting for the connection with the actuating means, said fulcrum members and said mounting members being of flattened formation and having their vertical dimensions in excess of their front to rear dimensions to provide for a close front to rear spacing thereof, substantially as described.

17. In a lifting jack, the combination of a standard provided with a standard socket, a fulcrum block supported upon the standard socket and having its outer face and upper edge unobstructed thereby, a lever provided with a fulcrum bar resting upon the upper edge of the fulcrum bearing block, and lifting members in closely spaced front to rear relation to the unobstructed face of the fulcrum bearing block and actuated by the lever, substantially as described.

18. In a lifting jack, the combination of a standard provided with a standard socket, a fulcrum block supported upon the standard socket and having its outer face and upper edge unobstructed thereby, a lever provided with a fulcrum bar resting upon the upper edge of the fulcrum bearing block, a hanger in closely spaced front to rear relation with the unobstructed face of the fulcrum bearing block and flattened at its upper end and provided with supporting shoulders, flattened bearing blocks supported within the lever and engaging such shoulders, and lifting means actuated by the movements of said hanger, substantially as described.

19. In a lifting jack, the combination of a standard provided with a standard socket, a fulcrum block centrally supported upon the front face of the standard socket and having its outer face and upper edge unobstructed thereby, a lever head embracing the standard socket and the fulcrum block, a single fulcrum bar extending transversely through the lever head and resting upon the upper edge of the fulcrum block, and lifting members associated with the lever head in closely spaced front to rear relation to the unobstructed face of the fulcrum bearing block, substantially as described.

ARTHUR L. STANFORD.